US012126002B2

(12) United States Patent
Kwack et al.

(10) Patent No.: US 12,126,002 B2
(45) Date of Patent: Oct. 22, 2024

(54) METHOD FOR MANUFACTURING CATHODE FOR LITHIUM-SULFUR BATTERY

(71) Applicants: LG ENERGY SOLUTION, LTD., Seoul (KR); LG ELECTRONICS INC., Seoul (KR)

(72) Inventors: Hobeom Kwack, Daejeon (KR); Yun Kyoung Kim, Daejeon (KR); Hyun Min Song, Pyeongtaek-si (KR); Yoon Hyun Kim, Pyeongtaek-si (KR); Jeong Won Kim, Pyeongtaek-si (KR); Dongseok Shin, Daejeon (KR)

(73) Assignees: LG Energy Solution, Ltd., Seoul (KR); LG Electronics Inc., Seoul (KR)

( * ) Notice: Subject to any disclaimer, the term of this patent is extended or adjusted under 35 U.S.C. 154(b) by 93 days.

(21) Appl. No.: 17/926,885

(22) PCT Filed: Nov. 17, 2021

(86) PCT No.: PCT/KR2021/016823
§ 371 (c)(1),
(2) Date: Nov. 21, 2022

(87) PCT Pub. No.: WO2022/114651
PCT Pub. Date: Jun. 2, 2022

(65) Prior Publication Data
US 2023/0207771 A1    Jun. 29, 2023

(30) Foreign Application Priority Data
Nov. 25, 2020 (KR) ................. 10-2020-0160370

(51) Int. Cl.
*H01M 4/04*   (2006.01)
*H01M 4/139*   (2010.01)
*H01M 10/052*   (2010.01)

(52) U.S. Cl.
CPC ....... *H01M 4/0404* (2013.01); *H01M 4/0471* (2013.01); *H01M 4/139* (2013.01); *H01M 10/052* (2013.01)

(58) Field of Classification Search
CPC ....................................................... H01M 4/04
See application file for complete search history.

(56) References Cited

U.S. PATENT DOCUMENTS

| | | | |
|---|---|---|---|
| 2017/0155129 A1* | 6/2017 | Fu | H01M 4/622 |
| 2018/0111388 A1* | 4/2018 | Fujita | B41J 11/00216 |
| 2018/0331352 A1* | 11/2018 | Morales Palomino | H01M 4/1393 |
| 2020/0152962 A1 | 5/2020 | Woo et al. | |

FOREIGN PATENT DOCUMENTS

| | | |
|---|---|---|
| CN | 106784601 A | 5/2017 |
| CN | 110350182 B | 8/2020 |
| JP | 3679718 B2 | 8/2005 |
| KR | 10-2002-0055869 A | 7/2002 |
| KR | 10-2013-0101174 A | 9/2013 |
| KR | 20130101174  * | 9/2013 |
| KR | 10-2015-0037242 A | 4/2015 |
| KR | 10-2018-0010862 A | 1/2018 |
| KR | 10-2042755 B1 | 11/2019 |
| KR | 10-2019-0133530 A | 12/2019 |
| WO | 02/054510 A1 | 7/2002 |

OTHER PUBLICATIONS

Machine translation of document N.*

* cited by examiner

*Primary Examiner* — Austin Murata
(74) *Attorney, Agent, or Firm* — Bryan Cave Leighton Paisner LLP

(57) ABSTRACT

The present disclosure relates to a method for manufacturing a positive electrode for a lithium-sulfur battery including: (1) mixing a sulfur-carbon composite and a binder to prepare a slurry for a positive electrode active material; (2) applying the slurry for the positive electrode active material to one surface of the current collector; (3) a first drying step of drying the current collector, to which the slurry is applied, using hot air and medium wave infrared radiation; and (4) a second drying step of drying the current collector, to which the slurry is applied, using a laser heat source after the first drying step (3).

8 Claims, 3 Drawing Sheets

[Figure 1]
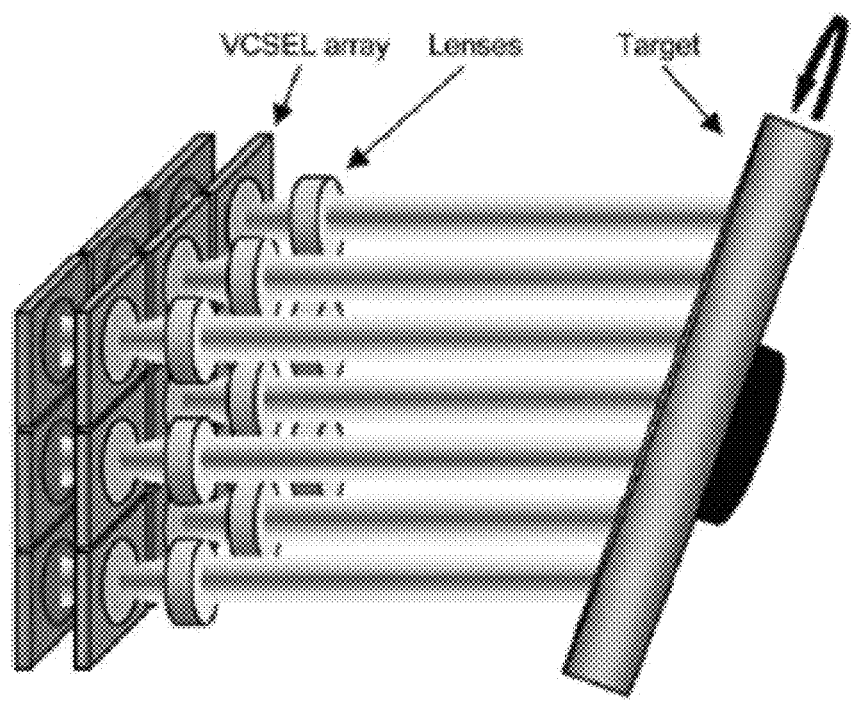
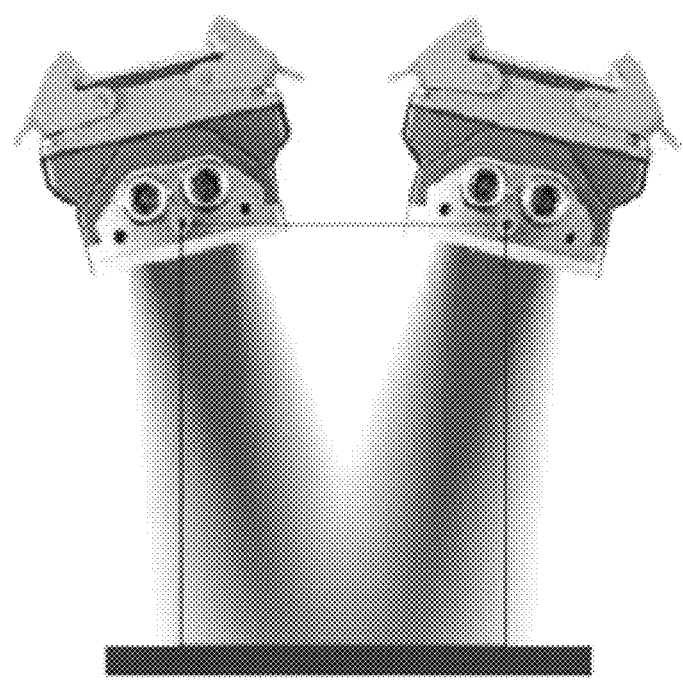

【Figure 2】
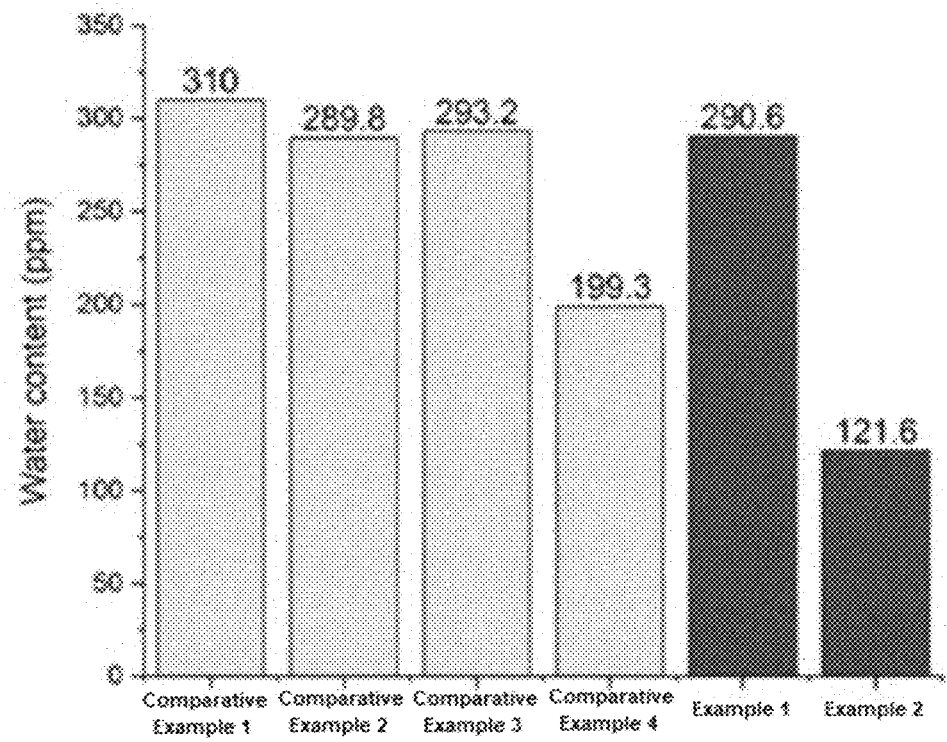
【Figure 3】
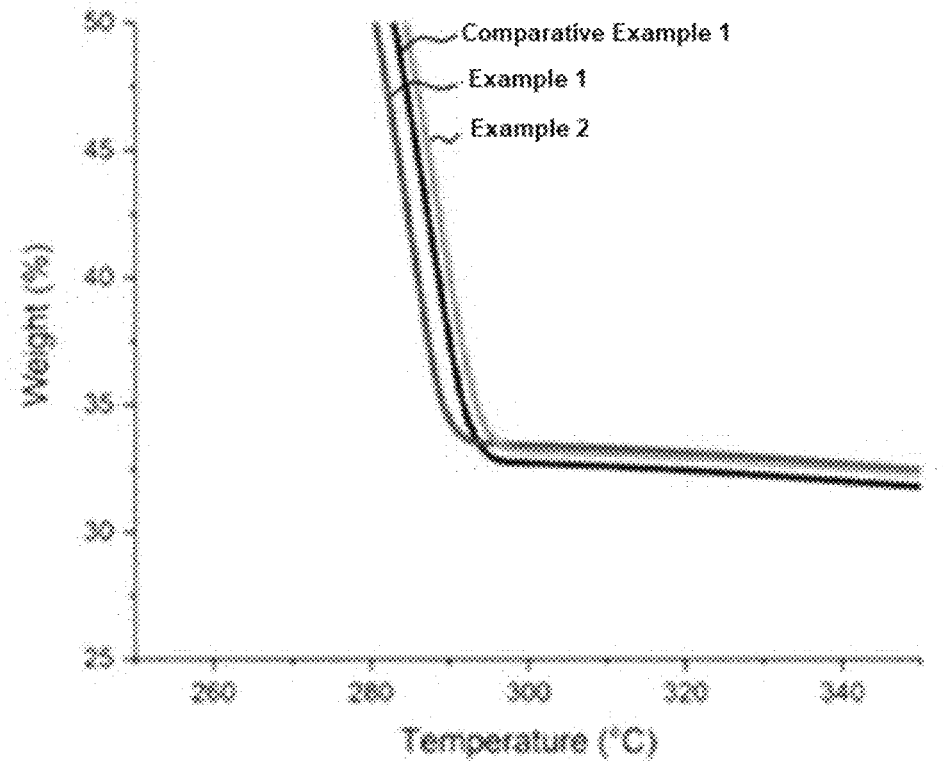

【Figure 4】
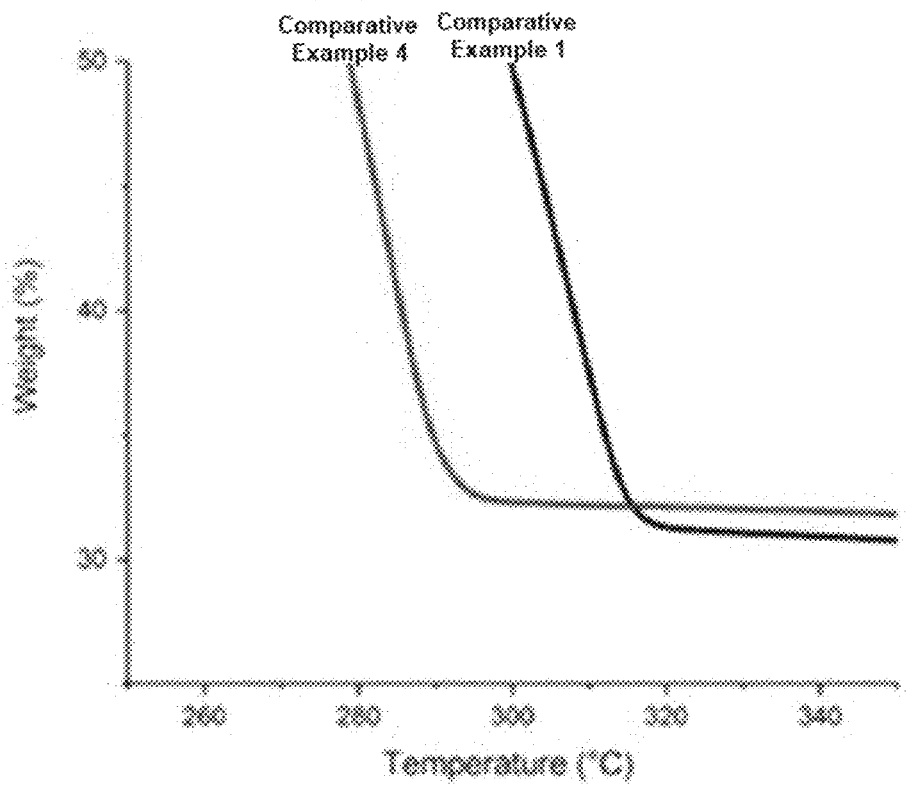
【Figure 5】
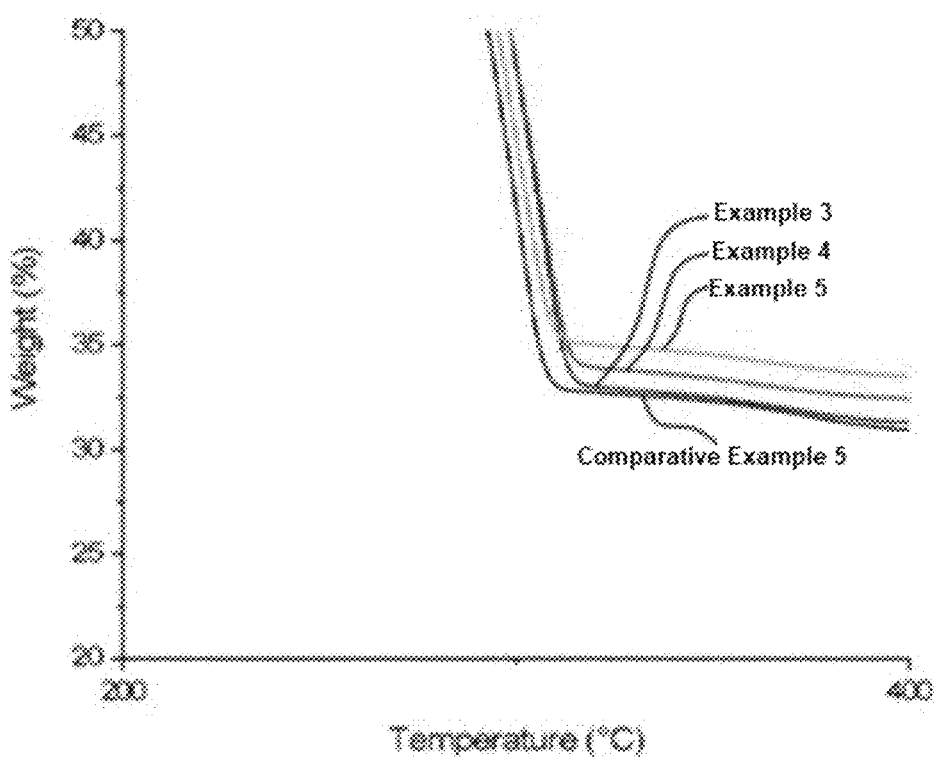

METHOD FOR MANUFACTURING CATHODE FOR LITHIUM-SULFUR BATTERY

CROSS CITATION WITH RELATED APPLICATIONS

The present application is a National Phase entry pursuant to 35 U.S.C. § 371 of International Application No. PCT/KR2021/016823, filed on Nov. 17, 2021, and claims priority to and the benefit of Korean Patent Application No. 10-2020-0160370, filed on Nov. 25, 2020, the entire contents of which are incorporated herein by reference in their entirety.

TECHNICAL FIELD

The present invention relates to a method for manufacturing a positive electrode for lithium-sulfur battery, and more particularly, to a method for manufacturing a positive electrode for lithium-sulfur battery including a drying step using a laser heat source.

BACKGROUND

As the application range of secondary batteries is expanded from small portable electronic devices to medium and large-sized electric vehicles (EV), energy storage systems (ESS), electric ships, etc., the demand for lithium secondary batteries with high capacity, high energy density and long lifetime is rapidly increasing.

Among them, the lithium-sulfur battery means a battery system using a sulfur-based material having 'a sulfur-sulfur bond (S—S bond)' as a positive electrode active material and using lithium metal as a negative electrode active material. Sulfur, which is the main material of the positive electrode active material, has properties in that it has a low atomic weight, is very rich in resources and thus easy to supply and receive, and also is cheap, thereby lowering the manufacturing cost of the battery, and is non-toxic and thus environmentally friendly.

In particular, the lithium-sulfur battery has a theoretical discharge capacity of 1,675 mAh/g-sulfur, and can theoretically realize a high energy storage density of 2,600 Wh/kg compared to its weight. Therefore, since the lithium-sulfur battery has a very high value compared to the theoretical energy density of other battery systems (Ni-MH battery: 450 Wh/kg, Li—FeS battery: 480 Wh/kg, Li—MnO$_2$ battery: 1,000 Wh/kg, Na—S battery: 800 Wh/kg) and a lithium-ion battery (250 Wh/kg) currently being studied, it is receiving great attention in the market of medium and large-sized secondary batteries that are being developed so far.

The lithium-sulfur battery has a positive electrode, a negative electrode, a separator, and an electrolyte solution as basic components, and among them, the positive electrode corresponds to the main component of the lithium-sulfur battery in that the positive electrode active material can have a great effect on the performance of the battery. The positive electrode can be prepared by first adding a binder and a solvent to the positive electrode active material to prepare a slurry for the positive electrode active material in a fluid form, and then applying the slurry on a current collector and drying it.

In relation to the manufacturing process of the lithium-sulfur battery, there have been a question about the stability of the lithium-sulfur battery in that since lithium metal, which is highly reactive, is used as the negative electrode, if the moisture in the electrode is not sufficiently removed, a side reaction between the negative electrode and the electrolyte solution may be caused, accelerating the degradation of the battery and resulting in gas generation in the battery.

In order to solve this problem, there have been various attempts to remove the moisture contained in the positive electrode of the lithium-sulfur battery.

As an example, there was an attempt to apply vacuum drying used in a lithium-ion battery as it is, but in this case, the loss rate of sulfur, which is the active material, was large, and in the case of lowering the temperature or the degree of vacuum in order to prevent this, it was difficult to sufficiently remove the moisture in the electrode. In addition, in the case of the drying method at a high temperature, since sulfur has a low melting point and a low volatilization point, the active material was easily lost or melted, resulting in a problem in that the shape of the electrode itself is deformed.

In the conventional case of drying using medium wave infrared radiation, it is not effective to prevent the loss of sulfur, and also it takes a long drying time of several minutes. In order to improve this problem, it is necessary to improve the drying section and running speed. However, it has been pointed out that in order to increase the drying section, there is a limitation in that additional spatial constraints must be considered.

Therefore, there is a need for research and development on a method for manufacturing a positive electrode for lithium-sulfur battery, which is improved in terms of drying method so that it is possible to minimize the loss of sulfur contained in the positive electrode active material, even while uniformly transferring heat into the positive electrode and irradiating a large area at once, thereby having the effect of excellently reducing the moisture content, and improving the production speed of the positive electrode by shortening the drying time.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

It is an object of the present invention to provide a method for manufacturing a positive electrode for a lithium-sulfur battery including a drying method capable of effectively removing the moisture contained in the positive electrode and shortening the drying time, even while minimizing the loss of sulfur contained in the positive electrode active material.

Technical Solution

According to a first aspect of the present invention, the present invention provides a method for manufacturing a positive electrode for a lithium-sulfur battery, comprising: (1) mixing a sulfur-carbon composite and a binder to prepare a slurry for a positive electrode active material; (2) applying the slurry for the positive electrode active material to one surface of a current collector; (3) a first drying step of drying the current collector, to which the slurry is applied, using hot air and medium wave infrared radiation; and (4) a second drying step of drying the current collector, to which the slurry is applied, using a laser heat source after the first drying step (3).

The laser heat source may irradiate heat in a surface emitting form.

The laser heat source may irradiate heat in a surface emitting form.

The laser heat source may irradiate heat having a size of 5 to 20 cm in width and 3 to 10 cm in length.

The laser heat source may have an output of 160 to 750 W.

The laser heat source may irradiate heat for 0.1 to 2 seconds.

The laser heat source may irradiate heat having a wavelength of 950 to 1000 nm.

The laser heat source may irradiate heat having an accumulated energy density of 3 to 6 $J/cm^2$.

A loss rate of sulfur of the positive electrode for the lithium-sulfur battery that has completed the second drying step (4) may be 0.1 to 1.1 wt. %, as compared to that of the positive electrode for the lithium-sulfur battery that has completed the first drying step (3).

A moisture content in the positive electrode for the lithium-sulfur battery after the second drying step (4) may be 10 ppm to 500 ppm.

Advantageous Effects

The method for manufacturing the positive electrode for the lithium-sulfur battery according to the present invention has the effect of improving the speed of the process of manufacturing the positive electrode through shortening of the drying time, by using a surface emitting laser heat source that can uniformly irradiate a large area.

In addition, the method for manufacturing the positive electrode for the lithium-sulfur battery according to the present invention has an advantage of excellent moisture removal effect in the positive electrode, while minimizing the loss of sulfur contained in the positive electrode active material even in a short drying time.

BRIEF DESCRIPTION OF DRAWINGS

FIG. 1 is a schematic diagram illustrating a drying apparatus comprising a surface emitting laser used in the second drying of the positive electrode for the lithium-sulfur battery according to an embodiment of the present invention.

FIG. 2 is a graph showing the moisture content in positive electrodes manufactured according to the manufacturing method of the positive electrode for the lithium-sulfur battery according to the Example of the present invention and Comparative Example.

FIGS. 3, 4, and 5 are graphs showing the sulfur content in the positive electrodes manufactured according to the manufacturing method of the positive electrode for the lithium-sulfur battery according to the Example of the present invention and Comparative Example.

DETAILED DESCRIPTION

The embodiments provided according to the present invention can all be achieved by the following description. It is to be understood that the following description describes preferred embodiments of the present invention, and it should be understood that the present invention is not necessarily limited thereto.

As a result of the experiments of the inventors of the present invention, the conventional manufacturing method of a positive electrode for a lithium-sulfur battery is not effective in removing moisture contained in the electrode, and thus there were limitations that the deterioration of the battery was easily accelerated due to a reaction between residual moisture and lithium metal used as a negative electrode, that the production process of the positive electrode was not efficient due to the long drying process, and that the loss of sulfur was accompanied when drying.

In order to solve the above problems, the inventors of the present invention have come to invent a method for manufacturing a positive electrode for a lithium-sulfur battery, which can effectively remove the moisture from the positive electrode in a short time, even while reducing the loss of sulfur which is the active material, by performing the second drying using a laser heat source after the first drying.

The method of manufacturing the positive electrode for the lithium-sulfur battery according to the present invention comprises (1) a step of mixing a sulfur-carbon composite and a binder to prepare a slurry for a positive electrode active material; (2) a step of applying the slurry for the positive electrode active material to one surface of the current collector; (3) a first drying step of drying the current collector, to which the slurry was applied, using hot air and medium wave infrared radiation; and (4) a second drying step of further drying using a laser heat source after the first drying step.

(1) Step of Preparing Slurry for Positive Electrode Active Material

The method of manufacturing the positive electrode for the lithium-sulfur battery comprises (1) a step of mixing a sulfur-carbon composite and a binder to prepare a slurry for a positive electrode active material.

In the case of sulfur contained in the sulfur-carbon composite, since it has no electrical conductivity by itself alone, it can be used in combination with a conductive material such as a carbon material, and thus sulfur may be included in the form of a sulfur-carbon composite.

The loading amount of sulfur of the positive electrode may be 1 $mAh/cm^2$ or more, 2 $mAh/cm^2$ or more, or 3 $mAh/cm^2$ or more, and 10 $mAh/cm^2$ or less, 9 $mAh/cm^2$ or less, or 8 $mAh/cm^2$ or less.

The carbon contained in the sulfur-carbon composite is a porous carbon material and provides a framework capable of uniformly and stably immobilizing sulfur and compensates for the low electrical conductivity of sulfur so that the electrochemical reaction can proceed smoothly. The porous carbon material can generally be prepared by carbonizing various carbonaceous precursors, and the porous carbon material may comprise uneven pores therein.

The shape of the porous carbon material is in the form of sphere, rod, needle, plate, tube, or bulk, and can be used without limitation as long as it is commonly used in a lithium-sulfur battery. The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and graphite such as natural graphite, artificial graphite and expanded graphite, and activated carbon.

The preparation method of the sulfur-carbon composite is not particularly limited in the present invention, and a method commonly used in the art may be used.

In step (1), the amount of the sulfur-carbon composite relative to the total weight of the slurry for the positive electrode active material may be 85 wt. % or more, 86 wt. % or more, 87 wt. % or more, 88 wt. % or more, 89 wt. % or more, or 90 wt. % or more, 91 wt. % or more, 92 wt. % or more and 98 wt. % or less, 97 wt. % or less, 96 wt. % or less.

The binder maintains the positive electrode active material in the current collector, and organically connects between the positive electrode active materials to increase the bonding force between them, and any binder known in the art may be used.

For example, the binder may be any one selected from polyvinylidene fluoride (PVDF), polytetrafluoroethylene, polyvinylpyrrolidone, styrene butadiene rubber, acrylonitrile-butadiene rubber, styrene-isoprene rubber, carboxymethyl cellulose, lithium polyacrylate and combinations thereof.

In step (1), the amount of the binder relative to the total weight of the slurry for the positive electrode active material may be 2 wt. % or more, 2.5 wt. % or more, 3 wt. % or more, or 3.5 wt. % or more, and 6 wt. % or less, 5.5 wt. % or less, 5 wt. % or less, or 4.5 wt. % or less.

The slurry for the positive electrode active material may further comprise an electrically conductive material.

The electrically conductive material is a material that electrically connects an electrolyte solution to a positive electrode active material and serves as a path through which electrons move from the current collector to the positive electrode active material, and is not particularly limited as long as it has conductivity.

For example, as the electrically conductive material, graphite such as natural graphite or artificial graphite; carbon blacks such as Super-P, Denka black, acetylene black, Ketjen black, channel black, furnace black, lamp black, and thermal black; carbon derivatives such as carbon nanotubes and fullerenes; electrically conductive fibers such as carbon fibers and metal fibers; carbon fluoride; metal powders such as aluminum and nickel powder; or electrically conductive polymers such as polyaniline, polythiophene, polyacetylene, and polypyrrole may be used alone or in combination.

The slurry for the positive electrode active material may further comprise a solvent.

The solvent may be a solvent capable of uniformly dispersing the sulfur-carbon composite and the binder. The solvent is an aqueous solvent and water is most preferable, and in this case, the water may be distilled water or deionized water. However, the present invention is not necessarily limited thereto, and if necessary, a lower alcohol that is easily miscible with water may be used. The lower alcohol may be methanol, ethanol, propanol, isopropanol and butanol, and preferably, these may be used as a mixture with water.

(2) Step of Applying Slurry for Positive Electrode Active Material to One Surface of Current Collector The method of manufacturing the positive electrode for the lithium-sulfur battery comprises a step of applying the slurry for the positive electrode active material to one surface of the current collector.

The slurry for the positive electrode active material prepared through step (1) may be applied on one surface of a current collector.

The current collector is not particularly limited as long as it has electrical conductivity without causing chemical changes in the battery, and for example, stainless steel, aluminum, nickel, titanium, sintered carbon, or aluminum or stainless steel surface-treated with carbon, nickel, titanium, silver or the like can be used. In addition, the positive electrode current collector may typically have a thickness of 3 to 500 μm, and the current collector can enhance the bonding force with the positive electrode active material by having fine irregularities on its surface. The current collector may be, for example, formed in various forms such as film, sheet, foil, net, porous body, foam, nonwoven fabric or the like.

The application thickness of the slurry for the positive electrode active material may be 50 to 300 μm, preferably 100 to 250 μm, more preferably 150 to 200 μm, and it is preferable to apply the slurry for the positive electrode active material on the current collector through a method using a comma coater.

(3) First Drying Step

The method of manufacturing the positive electrode for the lithium-sulfur battery comprises (3) a first drying step of drying the current collector, to which the slurry was applied, using hot air and medium wave infrared radiation.

In order to remove the moisture from the slurry applied on the current collector when manufacturing the positive electrode for the lithium-sulfur battery, a drying process may be performed simultaneously using hot air and medium wave infrared radiation in the first drying step.

The hot air drying is a drying method in which the moisture is removed using a convection drying method, which may be performed by a method of transferring heat by irradiating hot air in a closed drying space or supplying heated air into the drying space, and thus heating the air medium.

In order to effectively remove the moisture in the slurry through the hot air drying, the temperature of the hot-air drying apparatus may be 70 to 100° C., preferably 80 to 90° C., and the air volume may be 3 to 10 m$^3$/min, preferably 4 to 6 m$^3$/min.

Drying through the medium wave infrared radiation is effective in that the moisture content in the electrode can be removed by vaporizing not only the moisture on the surface of the slurry, but also the moisture contained inside.

The drying process through the medium wave infrared radiation may use a drying device in the form of a heater, and may be performed by irradiating medium wave infrared radiation having a wavelength of 1 to 5 μm, preferably 1 to 3 μm, at a temperature of 70 to 100° C., preferably 80 to 90° C. for 1 to 6 minutes.

Step (3) may further comprise a step of pressing 'the first dried current collector after application of the slurry for the positive electrode active material'.

In the pressing step, 'the first dried current collector after application of the slurry for the positive electrode active material' may be put into a roll-press and compressed to have a constant thickness by a roll. In addition, it is possible to control the porosity of the positive electrode by adjusting the roll gap.

In addition, the release film may be placed on 'the first dried current collector after application of the slurry for the positive electrode active material' before the pressing step. If compression is performed after placing the release film, it is possible to prevent the positive electrode active material from sticking to the roll of the roll press and not being detached from it.

(4) Second Drying Step

The method of manufacturing the positive electrode for the lithium-sulfur battery comprises (4) a second drying step of further drying using a laser heat source after the first drying step.

Through the first drying through the hot air drying, a certain portion of the moisture contained in the slurry can be removed, but the remaining moisture may cause instability of the operation of the battery due to a side reaction with lithium metal, and thus an additional second drying process may be required.

Step (4) may be a step of drying by irradiating a laser heat source in a surface emitting form. In addition, the step (4) may be a step of drying by irradiating a surface emitting laser heat source having a size of 5 to 20 cm in width and 3 to 10 cm in length, preferably 10 to 16 cm in width and 4 to 7 cm in length.

The surface emitting laser has advantages in that it can have a fast-drying speed, a uniform drying effect, and a reduction effect in the loss amount of sulfur when drying by uniformly irradiating a large area, compared to a laser heat source in the form of a line beam or spot beam.

Specifically, in the case of drying the electrode manufactured using roll-to-roll processing, since a large area is uniformly irradiated at the same time through the laser of the surface emitting form, the movement of the electrode through the roll-to-roll process is made continuously, and drying of the entire area of the electrode can be made with only one line.

On the other hand, in the case of a line beam or a spot beam, since the width of the beam is small, as compared to a laser of surface emitting form, the area to which the laser is irradiated within the same time is relatively small, and thus it may have a disadvantage in the process in that after irradiating the laser in one line and moving the electrode to the next line, the non-irradiated portion of the electrode must be dried by irradiating the laser. In addition, it is possible to have a form capable of irradiating a large area by continuously disposing spot beam lasers, but the effect of uniformly transferring heat over the entire area may be lowered as compared to a laser of a surface emitting form.

Step (4) may be a step of irradiating the laser heat source with an output of 160 W or more, 180 W or more, 200 W or more, 220 W or more, 240 W or more, 260 W or more, or 280 W or more, and 750 W or less, 700 W or less, 650 W or less, 600 W or less, 550 W or less, 500 W or less, 450 W or less, 400 W or less, 380 W or less, 360 W or less, 340 W or less, or 320 W or less. In the case below the output range, it may not be enough to remove the moisture remaining in the electrode through the laser heat source, and in the case exceeding the above output range, sulfur in the positive electrode is melted from the carbon carrier due to the high output and thus the positive electrode may lose uniform electrical conductivity, and the sulfur may be lost due to the higher output, thereby reducing the performance of the electrode.

Step (4) may be a step of irradiating a laser heat source for a time of 0.1 seconds or more, or 0.15 seconds or more, and 2 seconds or less, 1.8 seconds or less, 1.6 seconds or less, 1.4 seconds or less, 1.2 seconds or less, 1 second or less, 0.9 seconds or less, 0.8 seconds or less, 0.7 seconds or less, or 0.6 seconds or less. In the case of irradiating for less than the above time, it may not be enough to remove the moisture remaining in the electrode through the laser heat source, and in the case of irradiating in excess of the above time, sulfur in the positive electrode is melted from the carbon carrier due to the high output and thus the positive electrode may lose uniform electrical conductivity, and the sulfur may be lost due to the higher output, thereby reducing the performance of the electrode.

Step (4) may be preferably a step of irradiating a laser heat source having a wavelength of 950 to 1000 nm. In the case of irradiating a laser of less than the wavelength, sulfur in the positive electrode may be melted or lost due to excessively high energy, and the function of the electrode may be lost, and in the case of irradiating a laser exceeding the wavelength, it may not be sufficient to remove the moisture remaining in the electrode through the laser heat source.

Step (4) may be a step of irradiating a laser heat source having an accumulated energy density of 3.0 $J/cm^2$ or more, 3.2 $J/cm^2$ or more, 3.4 $J/cm^2$ or more, 3.6 $J/cm^2$ or more, 3.8 $J/cm^2$ or more, 4.0 $J/cm^2$ or more, 4.2 $J/cm^2$ or more, 4.4 $J/cm^2$ or more, or 4.6 $J/cm^2$ or more, and 6.0 $J/cm^2$ or less, 5.8 $J/cm^2$ or less, 5.6 $J/cm^2$ or less, 5.4 $J/cm^2$ or less, or 5.2 $J/cm^2$ or less. In the case of less than the above accumulated energy density, the amount of energy transferred is insignificant and the drying effect may be small, and in the case of more than the above accumulated energy density, a laser heat source having excessively large energy is irradiated in a short time, so that there may be a problem in that the ratio of the sublimation and thus loss of sulfur is large.

After step (4) above, the moisture content in the positive electrode for the lithium-sulfur battery may be 10 ppm or more, 20 ppm or more, 30 ppm or more, 40 ppm or more, 50 ppm or more, 60 ppm or more, 70 ppm or more, 80 ppm or more, 90 ppm or more, or 100 ppm or more, and 500 ppm or less, 490 ppm or less, 480 ppm or less, 470 ppm or less, or 460 ppm or less. When the above range is satisfied, it is possible to reduce the possibility of causing a side reaction between the moisture remaining in the positive electrode and lithium metal, thereby preventing deterioration of the battery, and increasing stability during operation of the battery.

In comparison with the positive electrode for the lithium-sulfur battery that has completed the first drying of step (3), the loss rate of sulfur of the positive electrode for the lithium-sulfur battery after the second drying of step (4) may be 0.1 wt. % or more, 0.2 wt. % or more, or 0.3 wt. % or more, and 1.1 wt. % or less, 1.0 wt. % or less, 0.9 wt. % or less, 0.8 wt. % or less, 0.7 wt. % or less, 0.6 wt. % or less, or 0.5 wt. % or less. If the above range is satisfied, the loss rate of sulfur during the drying process is small, and thus the loading amount of sulfur sufficient to express the energy required for the lithium-sulfur battery may be exhibited. In the present specification, the loss rate of the sulfur may be defined as the difference in wt. % between the content of sulfur of the positive electrode before the second drying and the content of sulfur of the positive electrode after the second drying.

Hereinafter, preferred examples are presented to help the understanding of the present invention, but the following examples are provided only to make the present invention easier to understand, and the present invention is not limited thereto.

Example: Manufacture of Positive Electrode for Lithium-Sulfur Battery

Example 1

96 wt. % of sulfur-carbon composite (S:C=75:25 (weight ratio)) and 4 wt. % of LiPAA (Lithium Polyacrylate) as a binder were mixed to prepare a slurry for a positive electrode active material.

After applying the slurry for the positive electrode active material on one surface of the aluminum current collector, the first drying was carried out for 6 minutes using simultaneously hot air at 80° C. and a dryer in which a medium wave infrared radiation lamp at 90° C. is operated.

After the first drying was completed, a surface emitting laser heat source having a wavelength of 970 nm and an output of 300 W was irradiated for 0.2 seconds to perform an additional second drying to finally prepare a positive electrode for a lithium-sulfur battery.

Example 2

A positive electrode for a lithium-sulfur battery was manufactured in the same manner as in Example 1 above, except that in the manufacturing process of the positive electrode for the lithium-sulfur battery, the laser heat source during the second drying was irradiated for 0.5 seconds.

Comparative Example 1

A positive electrode for a lithium-sulfur battery was manufactured in the same manner as in Example 1 above, except that in the manufacturing process of the positive electrode for the lithium-sulfur battery, the drying process was performed by performing only the first drying without performing the additional second drying.

Comparative Examples 2 to 4

Positive electrodes for lithium-sulfur batteries were manufactured in the same manner as in Example 1 above, except that in the manufacturing process of the positive electrodes for the lithium-sulfur batteries, the second drying was additionally carried out for a certain period of time as shown in Table 1 below through a dryer, in which a medium wave infrared radiation lamp at 90° C. is operated, after the first drying.

TABLE 1

| | Type of heat source for second drying | Second drying time |
|---|---|---|
| Example 1 | surface emitting laser(300 W) | 0.2 seconds |
| Example 2 | surface emitting laser(300 W) | 0.5 seconds |
| Comparative Example 1 | — | — |
| Comparative Example 2 | medium wave infrared radiation | 5 minutes |
| Comparative Example 3 | medium wave infrared radiation | 10 minutes |
| Comparative Example 4 | medium wave infrared radiation | 30 minutes |

Comparative Example 5

A positive electrode for a lithium-sulfur battery was manufactured in the same manner as in Comparative Example 1 above, except that after only the first drying was completed in the same manner as in Comparative Example 1, absorption of moisture was proceeded by storing it in a state exposed to the outside air for a long time.

Example 3

A positive electrode for a lithium-sulfur battery was manufactured in the same manner as in Comparative Example 5 above, except that in Comparative Example 5, the second drying was performed by irradiating a laser heat source with an output of 384 W for 0.2 seconds.

Examples 4 and 5

Positive electrodes for lithium-sulfur batteries were manufactured in the same manner as in Example 3 above, except that the second drying was performed by varying the drying time as shown in Table 2 below through the laser heat source during the second drying.

TABLE 2

| | Type of heat source during second drying | Second drying time | Accumulated energy density |
|---|---|---|---|
| Example 3 | surface emitting laser(384 W) | 0.2 seconds | 1.92 J/cm$^2$ |
| Example 4 | surface emitting laser(384 W) | 0.5 seconds | 4.80 J/cm$^2$ |
| Example 5 | surface emitting laser(384 W) | 1.0 seconds | 9.60 J/cm$^2$ |

Experimental Example 1: Evaluation of Moisture Content in Positive Electrode

For the positive electrodes for the lithium-sulfur batteries manufactured by Examples 1 and 2 and Comparative Examples 1 to 4, the moisture content in the electrodes was measured using a moisture content measuring device (Metrom, 831 KF Coulometer), and the results are shown in Table 3 below and FIG. 2. Also, for Examples 3 to 5 and Comparative Example 5, the moisture content was measured in the same manner, and the results are shown in Table 3.

TABLE 3

| | Moisture content in the electrode (ppm) |
|---|---|
| Example 1 | 290.6 |
| Example 2 | 121.6 |
| Example 3 | 743.1 |
| Example 4 | 312.5 |
| Example 5 | 534.0 |
| Comparative Example 1 | 310.0 |
| Comparative Example 2 | 289.8 |
| Comparative Example 3 | 293.2 |
| Comparative Example 4 | 199.3 |
| Comparative Example 5 | 600.0 |

As shown in Table 3 and FIG. 2 above, it was confirmed that in the case of Examples 1 and 2, although the second drying was performed for a short time of 0.2 to 0.5 seconds using the laser heat source, the moisture content was reduced by more than 19.4 ppm compared to Comparative Example 1 in which only the first drying was performed.

In particular, it was confirmed that in the case of Example 2, the drying effect of removing moisture from the electrode was excellent to such an extent that the decrease in moisture content reached 188.4 ppm compared to Comparative Example 1, even after the second drying was performed for a short time of 0.5 seconds with a laser heat source.

On the other hand, it was confirmed that in the case of Comparative Examples 2 to 3 using medium wave infrared radiation, even after drying for 5 and 10 minutes, respectively, the decreases in moisture content were not significantly different from Example 1, which was laser-dried for only 0.2 seconds, and in the case of Comparative Example 4, which was dried for 30 minutes, the drying effect was significantly lower than that of Example 2, which was laser-dried for only 0.5 seconds.

Through the above results, it was confirmed that after the first drying, the second drying using a surface emitting laser heat source has an effect of uniformly drying a large area within a short time of several seconds.

In addition, it was confirmed that as the experimental results of Examples 3 to 5 in which the output and drying time were different for a positive electrode such as Comparative Example 5 with a high moisture content in the electrode after the first drying, Example 4 having a cumulative energy density of 3 to 6 J/cm$^2$ has an excellent drying effect. In Example 3, it was confirmed that the drying effect was insignificant due to an excessively short drying time, and rather rapid re-absorption was occurred, and in Example 5, it was confirmed that the accumulated energy density was relatively large, but re-absorption was quickly proceeded after drying.

Experimental Example 2: Evaluation of Loss of Sulfur Content in Positive Electrode For the positive electrodes for lithium-sulfur batteries manufactured by Examples 1 to 5 and Comparative Examples 1, 4 and 5, the sulfur content in the electrode was measured by thermogravimetric analysis (TGA) through a thermogravimetric analyzer (Mettler Toledo, TGA/DSC 2), and the results are shown in Tables 4 and 5 below and FIGS. 3 and 4.

TABLE 4

|  | Sulfur content in the electrode (wt. %) |
|---|---|
| Example 1 | 66.5 |
| Example 2 | 66.7 |
| Example 3 | 67.04 |
| Example 4 | 66.22 |
| Example 5 | 65.09 |
| Comparative Example 1 | 67.2 |
| Comparative Example 4 | 66.4 |
| Comparative Example 5 | 67.21 |

As shown in Table 4, it was confirmed that Examples 1 and 2 in which the second drying was performed using the laser heat source had the loss ratio of the sulfur content of 0.7 and 0.5 wt. %, respectively, compared to Comparative Example 1 in which the second drying was not performed at all, whereas Comparative Example 4 in which the second drying was performed through the medium wave infrared radiation had the loss ratio of the sulfur content of 0.8 wt. %.

It was confirmed that Comparative Example 4 had a long drying time of 30 minutes and the loss of sulfur content thereof was relatively large compared to those of Examples, whereas Examples 1 and 2 are effective drying methods for a positive electrode for lithium-sulfur battery in that even if the loss of sulfur according to the second drying was occurred, a relatively small loss of 0.7 wt. % or less was exhibited, and as in Experimental Example 1, an excellent drying effect was exhibited even with short drying of 0.5 seconds or less.

In addition, it was confirmed that as the experimental results of Examples 3 to 5 in which the output and drying time were different for a positive electrode such as Comparative Example 5 with a high moisture content in the electrode after the first drying, Example 4 having a cumulative energy density of 3 to 6 J/cm$^2$ has the effect of effectively reducing the moisture content within a short time of 0.5 seconds while having a small loss rate of sulfur of less than 1%.

All simple modifications and variations of the present invention fall within the scope of the present invention, and the specific scope of protection of the present invention will become apparent from the appended claims.

The invention claimed is:

1. A method for manufacturing a positive electrode for a lithium-sulfur battery comprising:
   (1) mixing a sulfur-carbon composite and a binder to prepare a slurry for a positive electrode active material;
   (2) a applying the slurry for the positive electrode active material to one surface of a current collector;
   (3) a first drying step of drying the current collector, to which the slurry is applied, using hot air and medium wave infrared radiation; and
   (4) a second drying step of drying the current collector, to which the slurry is applied, using a laser heat source after the first drying step (3),
   wherein the laser heat source irradiates heat having a wavelength of 950 to 1000 nm.

2. The method for manufacturing the positive electrode for the lithium-sulfur battery according to claim 1, wherein the laser heat source irradiates heat in a surface emitting form.

3. The method for manufacturing the positive electrode for the lithium-sulfur battery according to claim 1, wherein the laser heat source is a surface emitting laser heat source having a size of 5 to 20 cm in width and 3 to 10 cm in length.

4. The method for manufacturing the positive electrode for the lithium-sulfur battery according to claim 1, wherein the laser heat source has an output of 160 to 750 W.

5. The method for manufacturing the positive electrode for the lithium-sulfur battery according to claim 1, wherein the laser heat source irradiates heat for 0.1 to 2 seconds.

6. The method for manufacturing the positive electrode for the lithium-sulfur battery according to claim 1, wherein the laser heat source irradiates heat having a cumulative energy density of 3 to 6 J/cm$^2$.

7. The method for manufacturing the positive electrode for the lithium-sulfur battery according to claim 1, wherein when compared with the positive electrode for the lithium-sulfur battery after the first drying of step (3), a loss rate of sulfur of the positive electrode for the lithium-sulfur battery after the second drying of step (4) is 0.1 to 1.1 wt. %.

8. The method for manufacturing the positive electrode for the lithium-sulfur battery according to claim 1, wherein a moisture content in the positive electrode for the lithium-sulfur battery after the second drying step (4) is 10 ppm to 500 ppm.

* * * * *